United States Patent [19]

Mills et al.

[11] Patent Number: 5,232,712

[45] Date of Patent: Aug. 3, 1993

[54] EXTRUSION APPARATUS AND SYSTEMS

[75] Inventors: John F. Mills, Wakefield, R.I.; Nicholas F. Warner, Belmont, Mass.

[73] Assignee: Brown University Research Foundation, Providence, R.I.

[21] Appl. No.: 722,851

[22] Filed: Jun. 28, 1991

[51] Int. Cl.[5] .................. B29C 47/04; B29C 47/92
[52] U.S. Cl. .............................. 425/133.1; 425/70
[58] Field of Search ............... 425/133.1, 131.1, 70, 425/71, DIG. 47, 132; 264/4, DIG. 37

[56] References Cited

U.S. PATENT DOCUMENTS

| | | | |
|---|---|---|---|
| 3,962,383 | 6/1976 | Hagiwara et al. | 264/4 |
| 3,972,664 | 8/1976 | Fillmann | 425/133.1 |
| 4,055,205 | 10/1977 | Withoff et al. | 425/DIG. 47 |
| 4,171,561 | 10/1979 | Bainard et al. | 425/DIG. 47 |
| 4,251,195 | 2/1981 | Suzuki et al. | 425/70 X |
| 4,288,494 | 9/1981 | Porter et al. | 428/398 |
| 4,333,906 | 6/1982 | Porter et al. | 264/40.3 |
| 4,352,883 | 10/1982 | Lim | 435/178 |
| 4,353,888 | 10/1982 | Seftoa | 434/25 |
| 4,391,909 | 7/1983 | Lim | 435/178 |
| 4,426,337 | 1/1984 | Suzuki et al. | 264/4 |
| 4,657,496 | 4/1987 | Ozeki et al. | 425/133.1 X |
| 4,695,466 | 9/1987 | Morishita et al. | 424/456 |
| 4,867,664 | 9/1989 | Fukuhara | 425/133.1 X |
| 4,892,538 | 1/1990 | Aebischer et al. | 604/891.1 |
| 4,902,295 | 2/1990 | Walthall et al. | 623/11 |
| 4,902,450 | 2/1990 | Morrison | 264/4 |
| 4,907,957 | 3/1990 | Nakagawa et al. | 425/133.1 X |
| 4,954,067 | 9/1990 | Brussel | 425/DIG. 47 |

FOREIGN PATENT DOCUMENTS

| | | |
|---|---|---|
| 0116311 | 8/1984 | European Pat. Off. . |
| 0188309 | 7/1986 | European Pat. Off. . |
| 0213908 | 3/1987 | European Pat. Off. . |
| 2201129 | 3/1973 | France . |
| 2336176 | 7/1977 | France . |
| 2599639 | 12/1987 | France . |
| 104923 | 10/1964 | Norway ............... 425/70 |
| WO87/04367 | 7/1987 | PCT Int'l Appl. . |
| WO8904655 | 6/1989 | PCT Int'l Appl. . |
| 2094832A | 3/1982 | United Kingdom . |
| 2192171A | 1/1988 | United Kingdom . |

OTHER PUBLICATIONS

Tresco et al. (1992) Asaio Journal 38:17-23.
Aebischer et al. (1991) Science 252:133.
Winn et al. (1991) Experimental Neurology 113:322-329.
Aebischer et al. (1991) Brain Research 560:43-49.
Aebischer et al. (1991) J. Biomec. Engineering 113:178-183.
Aebischer et al. (1991) Experimental Neurology 111:269-275.
Aebischer et al. (1991) Biomaterials 12:50-56.
Jaeger et al. (1991) Brain Research 551:163-170.
Hoffman et al. (1990) Experimental Neurology 110:39-44.
Winn et al. (1989) Experimental Neurology 105:244-250.
Winn et al. (1989) J. Biomed. Mater. Res. 23:31-44.
Aebischer et al. (1988) Brain Research 448:364-368.
Jaeger et al. (1990) Progress in Brain Research 82:41-46.

(List continued on next page.)

Primary Examiner—Richard L. Chiesa
Attorney, Agent, or Firm—Thomas J. Engellenner; Matthew P. Vincent

[57] ABSTRACT

Systems are disclosed for forming an extrudate. The systems include an extrusion head assembly having at least a first inner bore and a second outer bore, a coagulant solution supply and a polymeric casting solution supply. The coagulant supply provides coagulant to the inner bore of the extrusion head assembly, and the polymeric casting solution supply provides a casting solution to the outer bore. Using this system, the coagulant and polymeric solution are coextruded to form an extrudate having a desired configuration. The present invention further includes a rapid action valve controlling at least one of the coagulant or polymer supplies.

9 Claims, 2 Drawing Sheets

OTHER PUBLICATIONS

Aebischer et al., "Long-Term Cross-Species Brain Transplantation of a Polymer-Encapsulated Dopamine-Secreting Cell Line," *Experimental Neurology* 111, 269–275 (1991).

Aebischer et al., "Macroencapsulation of dopamine-secreting cells by coextrusion with an organic polymer solution," Biomaterials 1991 vol. 12 Jan., p. 50.

Sefton et al., "Microencapsulation of Mammalian Cells in a Water-Insoluble Polyacrylate by Coextrusion and Inerfacial Precipitation," *Biotechnology and Bioengineering.* vol. XXIX, pp. 1135–1143 (1987).

Sugamore and Sefton, "Microencapsulation of Pancreatic Islets in a Water Insoluble Polyacrylate," vol. XXXV *Trans Am Soc Artifl Intern Organs* 1989, pp. 791–799.

EXTRUSION APPARATUS AND SYSTEMS

BACKGROUND OF THE INVENTION

The technical field of this invention concerns apparatus and systems for the extrusion of capsules, hollow fibers and the like.

Various extrusion apparatus are known in the art, primarily for use in fabricating hollow fibers. Typically, such extrusion systems include a spinneret with concentric bores. A fiber-forming material (e.g., a polymeric casting solution) is supplied to the outer bore while a coagulant or other fluid is delivered to the inner bore. As the two fluids flow through the nozzle, a hollow core extrudate is formed.

Spinneret-based systems can be difficult to operate. Most often, a manual "pulling" step is required to initiate the extrusion process. Even with careful cleaning, they are prone to clogging problems. Moreover, their sluggish response to changes in flow rate or fluid composition make it difficult to modify the extrudate via process controls.

Extrusion systems have also been proposed for the fabrication of living cell or tissue capsules, for therapeutic implants, bioreactors and the like. Unfortunately, existing techniques often produce macrocapsules with seams. This is due to the fact that an open end of the macrocapsule necessarily results from the macroencapsulation methods. For many applications, it is desirable to have a seamless capsule.

Thus, there exists a need for improved apparatus and systems for production of hollow fibers and/or macroencapsulation of cells. Encapsulation systems that enable production of fibers and encapsulated vehicles in an automated fashion, which permit the usage of a wider range of materials, and/or which provide more reliable and/or seamless closure, would satisfy a long felt need in the art.

SUMMARY OF THE INVENTION

Systems are disclosed for forming an extrudate. The systems include an extrusion head assembly having at least a first inner bore and a second outer bore, a coagulant supply means and a polymeric casting solution supply means. The coagulant supply means provides coagulant to the inner bore of the extrusion head assembly, and the polymeric casting solution supply means provides a casting solution to the outer bore. Using this system, the coagulant and polymeric solution are coextruded to form an extrudate having a desired configuration. The present invention further comprises at least one rapid action valve controlling at least one of the supply means.

In a preferred embodiment of the inventive system, one rapid action valve controls the coagulant supply, while a conventional or another rapid action valve controls the polymeric solution supply. The valves can be actuated electrostatically, pneumatically, or by other means, and can be controlled manually, by automatic timer, or by computer to provide rapid response times. In one embodiment, the rapid action valve can include a needle or plunger-type valve stem which cooperates with a valve seat. The rapid action valve preferably is integrated into the extrusion head assembly in close proximity to the end of the bore.

In one aspect of the invention, a rapid action valve design is disclosed which avoids leakage and/or backflow by employing a plunger and constriction-type seal to form a tight, non-leaking closure when the valve is actuated. The constriction seal is preferably formed from, or lined with, a compressible but highly durable substance which engages the plunger. In one embodiment, the constriction is a lip seal through which the plunger traverses.

When the rapid action valve is disposed in the inner bore of an extrusion system according to the present invention (e.g., in the coagulant supply line), the plunger can be constructed to move axially within the bore. When the valve is shut, the plunger is forced into engagement with the constriction or lips of the valve seat. The plunger can also be designed to pass through the lips of the seal and into the channel to purge it of the coagulant and/or casting solution.

In another aspect of the invention, a rapid action valve for controlling coagulant supply through an inner extrusion bore is disclosed in which the valve seat includes an abutment located at or near the end of the inner bore, such that a plunger or needle-type valve stem can engage the abutment to close the valve and thereby isolate any coagulant remaining in the inner bore from the exit channel.

The invention is especially useful in the production of cell-containing capsules and/or hollow fibers. The extrusion system permits highly accurate control of the extrusion parameters, thereby allowing the formation of complex shapes, such as strings of cell capsules and hollow fibers of particular shapes.

When used to form cell capsules, the system extrudes a polymeric solution which preferably forms a semipermeable membrane upon coagulation. The membrane is a porous structure capable, for example, of protecting encapsulated cells from autoimmune or viral assault, as well as from other detrimental agents in the external environment, while allowing essential nutrients, cellular waste products, and cell secretions to diffuse therethrough. As used herein, the term "selectively permeable" or "semipermeable" is used to describe biocompatible membranes which allow diffusion therethrough of solutes having a molecular weight up to about 150,000 (Mr).

The permeability of the polymeric membrane can be varied by controlling the viscosity of the polymeric casting solution, such that upon coagulation, the coating will form with a network of microchannels to provide diffusion pathways. In one embodiment, this can be achieved by employing a water-miscible solvent as a component of the polymeric solution and maintaining a pressure differential between the coagulant and the polymeric solution during extrusion. As the tubular extrudate forms, water from the coagulant infiltrates into the coagulating polymer to replace the solvent as the solvent is driven outward by the pressure difference. Upon coagulation, the water which has infiltrated into the polymeric membrane provides a network of pores. The optimal pressure and viscosity varies with the solvent and polymer employed, but can readily be ascertained for any particular polymer/solvent combination by those skilled in the art without undue experimentation.

The system disclosed herein can further include an aqueous quenchent bath for coagulating the polymeric solution following extrusion. The system may include various mechanisms for drying the extrudate as it emerges from the extrusion head, including blowers or evacuation chambers. The extrusion head assembly can incorporate additional bores to provide multiple coatings or to deliver a quenchent fluid about the tubular extrudate. When the coagulant is a cell-containing solution, the system can also include a sedimentation chamber for the cell suspension, or an equivalent cell packing mechanism, to increase the cell density within the aqueous cell suspension.

The invention will next be described in connection with certain illustrated embodiments, however, it should be clear that various additions, subtractions or modifications can be made by those skilled in the art without departing from the spirit or scope of the invention.

BRIEF DESCRIPTION OF THE DRAWINGS

Like reference characters in the respective figures indicate corresponding parts.

DETAILED DESCRIPTION OF THE PREFERRED EMBODIMENTS

Figure 1:
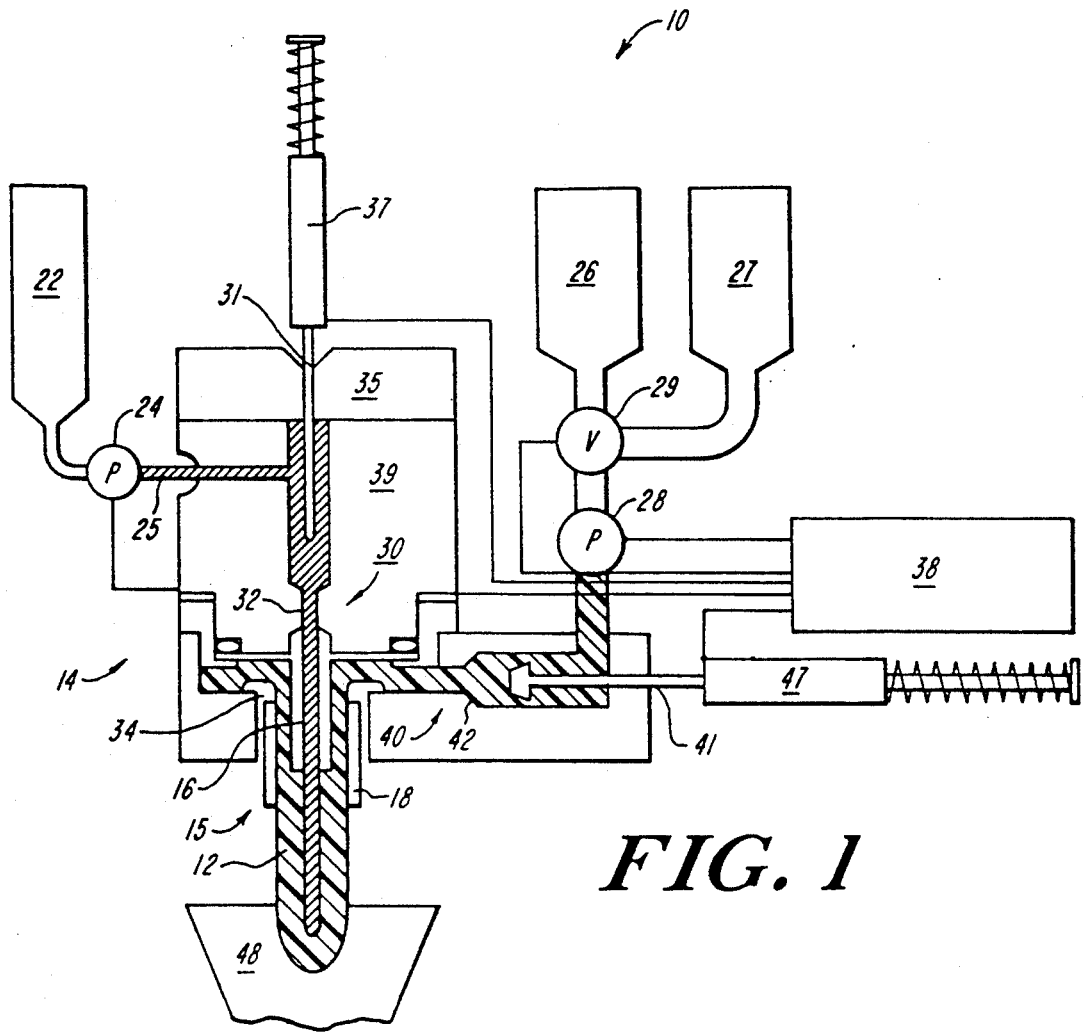
FIG. 1 is a schematic partial cross-sectional view of a system embodying the present invention.

In FIG. 1, a system 10 is shown for producing a hollow fiber or tubular cell capsule 12, including an extrusion head 14 having a nozzle 15, including a first (inner) bore 16 and a second outer bore 18. The system 10 further includes a coagulant supply source 22, an associated pump 24, a casting solution supply source 26 and an associated pump 28 and, optionally, a flush solution supply 27 with a valve 29. The pumps 24 and 28 are preferably variable pressure (or variable flow rate) pumps, such that pressure differentials (e.g., between the coagulant and the polymer solution) can be established during use. In one preferred embodiment, both the coagulant supply and the polymer supply are controlled by rapid action valves. As shown in FIG. 1, solenoid 37 controls the coagulant supply and solenoid 47 controls the polymer supply.

Additionally, the system can also, optionally, include an outer flowing quenchent supply 34 with an associated pump (not shown). All of the pump elements can be controlled manually or, preferably, by an automated controller 38 (e.g., a microprocessor). The controller 38 also preferably controls the solenoids 37 and 47 to initiate and stop the fluid flows, as well as flushing valve 29. The system 10 can also include a quenchent bath 40, which would normally be disposed directly below the extrusion head 14 during operation. Alternatively, the system can include a blower, or the system can be employed within an evacuated or other reduced pressure chamber to aid in solvent removal.

The extrusion head 14, includes an inner bore 16 for delivery of a coagulant and an outer bore 18 for delivery of a casting solution. When used to produce cell capsules, the coagulant preferably includes a cell suspension, or other biologically active material to be encapsulated. The casting solution preferably is a polymer and is alternately referred to herein as the polymeric solution. As the cell suspension and the polymeric solution are extruded through the nozzle, the polymeric solution coagulates to form an outer coating about the cell suspension.

The extrusion head 14 also includes a valve 30 having a retractable plunger 31 and a valve seat assembly 32. The plunger 31 operates to selectively start and stop the coagulant as it flows within the inner bore 16. When plunger 31 is retracted, the valve is open, and the coagulant flows into the inner bore where it is coextruded with the polymeric casting solution. At the same time, during extrusion operations, the casting solution flows from polymer inlet 25, the casting solution supply 26, past a valve assembly 40, and into the outer bore 18 where it is coextruded with the coagulant.

The valve assembly 40, used in conjunction with the casting solution supply 26, can similarly include a plunger 41 and seat 42 and may be controlled in a manner similar to that of the coagulant supply or may be manually or, otherwise, selectively operated. Alternatively, a barrel valve or other non volume-displacing valve can be employed to control the polymer flow.

As shown in FIG. 1, the extrusion head 14 includes a top seal 35 through which the valve stem 31 passes. Within the extrusion head 14, valve 30 is formed when the plunger 31 engages the valve seat 32. In the illustrated embodiment, the valve seat and the coagulant flow channel are formed as a unitary block of material 39. A portion of this material 39 forms a constriction or lip seal 32 to engage the plunger. The seal material should be a compressible but highly durable substance, such as a polymeric elastomer. Such elastomers can include fluorocarbons, generally, and reinforced elastomers, in particular, such a RULON TM, a glass-filled polytetrafluoroethylene. The constriction 32 in the center bore is designed so that it is slightly smaller in diameter than the plunger 31 to allow a tight, non-leaking seal.

The length of the plunger 31 should be of sufficient length so that it can traverse a substantial portion of the inner bore and, preferably, the distance it travels can be adjusted. In some applications, it may be preferable for the plunger 31 to traverse substantially the entire length of the inner bore 16 in order to purge it of coagulant.

Figure 2:
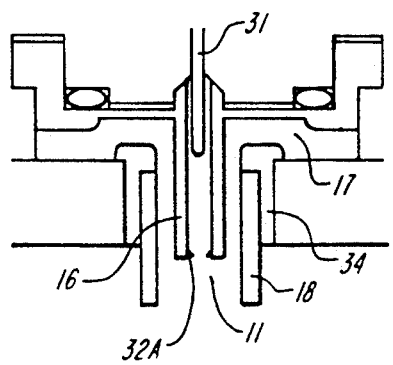
FIG. 2 is a schematic cross-sectional view of an alternative valve design according to the present invention.

In another embodiment, as shown in FIG. 2, a valve seat 32A can be incorporated at the very end of the inner bore to permit maximal response time in flow characteristics of the coagulant fluid. In this embodiment, the plunger 31 is driven through the inner bore 16 by the solenoid 37 until it engages the valve seat 32A. As shown in FIG. 2, the end of the center bore should be situated within the exit channel 11 so as to optimize polymer flow characteristics and/or avoid backflow of coagulant into the polymer reservoir 17 of the extrusion head assembly.

Figure 3A:
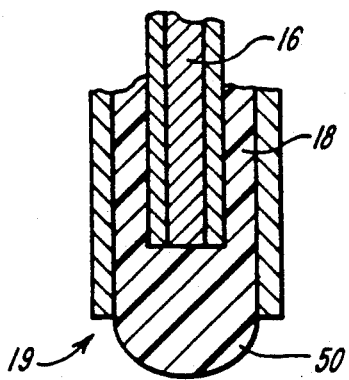
FIG. 3A is a schematic illustration of an initial stage of an extrusion technique according to the invention.

Using the system of the invention, the polymer solution supply pump 28 is activated to initiate extrusion of the polymer solution to the outer bore 18. By, thus, initiating flow, one end of the fiber or capsule is subsequently formed as a closed cap 50, as shown in FIG. 3A. Within about 10 milliseconds (msec) to about one second, the coagulant supply pump is activated to initiate delivery of the coagulant to the second, innermost bore 16. The preferred range is between about 300 and 700 msec; typically, approximately 500 msec. The exact timing depends on the type of polymer used as the casting solution. It should be noted that after initial operations, there may be sufficient residual polymer in the exit channel 11 and/or polymer reservoir 17 to allow the initiation of coagulant flow to be simultaneous or even precede the initiation of the polymer flow and still produce smooth capsules and/or fibers.

The coagulant can be a simple coagulating fluid or it can include biological, or other, material to be encapsulated. If the coagulant includes cells, the coagulant is a physiologically compatible aqueous solution (e.g., saline), buffered saline, culture medium, or the like.

Figure 3B:
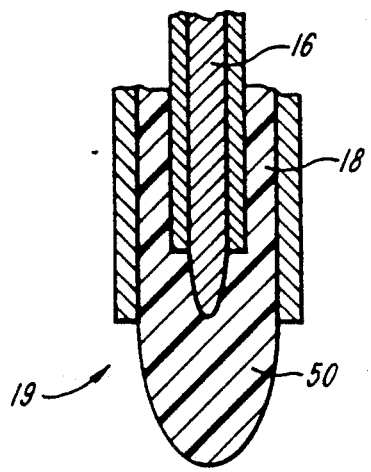
FIG. 3B is a schematic illustration of a subsequent stage in the extrusion shown in FIG. 3A.
Figure 3C:
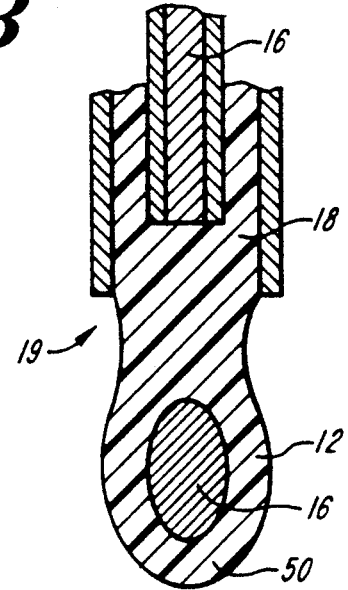
FIG. 3C is a schematic illustration of a further stage in the extrusion shown in FIG. 3B.

As shown in FIG. 3B, initiating flows of coagulant begins formation of a central tube of coagulant or encapsulated material. Next, delivery of the coagulant is terminated (at least temporarily). This results in a hollow fiber of desired length or a completely encapsulated aliquot of material, as shown in FIG. 3C. At this point, extrusion of the polymer casting solution may be terminated to form a single vehicle. Different forms of cell transporting vehicles may be manufactured using the inventive system. In hollow fiber fabrication, it will typically be desirable to cut off one or both of the ends of the extrudate.

When the system 10 of FIG. 1 is employed to shape the tubular extrudate into a multi-compartment cell capsule string, a retraction means can be employed to periodically retract the inner bore 16 so as to interrupt the flow of the cell suspension. This retraction means can take various forms, and may be similar to that used for selectively retracting the plunger 31. For example, the inner bore can slide along its longitudinal axis and be retracted by motor and pivot arms. Alternatively, the retraction can be accomplished by eccentric cam elements, or a simple lever, or other means obvious to those skilled in the art. The effect of these retractions is to periodically seal the tubular extrudate and again form multiple compartments. In yet another alternative approach, the controller 38 (shown in FIG. 1) can vary the pressure or flow applied by pump 24 (and/or pump 28) to create periodic interruptions in the flow of the cell suspension.

In one form of the system of the present invention, a multiple annular spinneret may be used, similar to that used in forming hollow fibers. Using a spinneret, the method provides for "autoinitiation" of extrusion without the need for mechanical assistance or spinning. That is, initiating extrusion of the casting solution to the outer bore 18 automatically begins vehicle formation. This autoinitiation enables the endcaps 50 of the resulting vehicles, as shown in FIG. 3A, to be smooth and seamless, and eliminates the need to manually initiate extrusion. The inclusion of the valves 30 and 40 assist in both autoinitiation and termination to form seamless, smooth extrudate.

To produce a desired shape leading edge of a capsule, phase inversion (i.e., onset of coagulant flow) must occur at an optimal time during nascent droplet formation of the casting solution on the extrusion nozzle. The optimal timing of coagulant onset will produce a leading edge of the incipient capsule which is curved and smooth. The timing can be precisely controlled to produce capsules that have ends that are bullet-shaped, bulbous (as the end of a dumbel or a scallion), or a variety of other configurations, particularly if additional forces (beside gravity) are appropriately applied during extrusion. To insure the reproducible formation of a smooth leading edge, care must also be taken to avoid practices which lead to nozzle clogging during extrusion initiation (e.g., high ambient humidity or excessive recess of the inner bore).

Factors affecting casting solution droplet growth size and shape on the extrusion nozzle in the absence of coagulant include: nozzle geometry; flow rate of the casting solution; annulus size; wetting characteristics of nozzle material; and surface tension of the polymer.

Annulus size and wetting characteristics of the nozzle material define the size of drop that can be supported for a given polymer. In conjunction with nozzle geometry, flow rate defines the growth rate and the shape of the nascent droplet. Surface tension of the polymer will also influence the size and shape of the droplet, and the size droplet that can be supported. The following is a list of additional factors which may distort the nascent droplet to a geometry other than hemispherical (in some cases, one or more of these forces may actually be employed to produce a leading edge of a given geometry): positive pressure due to onset of coagulant flow; angle of the nozzle relative to gravity; vibration; application of vacuum to the outside of the nozzle; the use of a static electricity source to distend the droplet; mechanical extraction of the nascent droplet (e.q., through the use of an appropriately-positioned capillary tube beneath the nozzle).

Once the desired shape droplet is achieved and the time to form the droplet for a given polymer flow rate is determined, additional considerations can be employed to insure appropriate autoinitiation and smooth capsule leading edge production. For most applications, the size of the drop of casting solution at the onset of coagulant flow is preferably so small as to have minimal outward curvature. If the drop is allowed to become larger than hemispherical (i.e., the angle of incidence to the annular lip is greater than 90°), bulbous end capsules will be produced. Any effects on droplet shape and size due to any increase in pressure caused by initiation of the coagulant flow should be anticipated and accounted for in determining the appropriate time to begin casting solution flow.

During the repetitive extrusion of capsules, termination of casting solution flow between sequential capsules should occur cleanly. Clean termination is important for the production of a properly-formed trailing edge of the extruded capsule, as well as controlled and predictable formation of the leading edge of the subsequent capsule. Clean termination refers to the termination of casting solution flow in such a fashion that when the extruded capsule falls away no residual, unprecipitated or partially precipitated already-extruded casting solution remains attached to the nozzle. Such residual solution often results in a detrimental shape or geometry of the subsequent capsule or causes nozzle clogging.

Clean termination disrupts the continuity between the unpolymerized polymer in the trailing edge of the extruded capsule and the polymer remaining in the extrusion nozzle. Such disruption assures that no detrimental shapes are produced in either the trailing edge of the extruded capsule or in the leading edge of the subsequent capsule. The following methods may be useful in producing clean termination: the rate of extrusion of the capsule can be adjusted; flow rates of polymer and/or coagulant can be increased resulting in a higher velocity of capsule extrusion; varying the velocity of the plunger 31 during the closure stroke can be used to change the velocity of capsule extrusion independent of polymer or coagulant flow rates. Alternatively, the plunger 31 can be constructed so that after sealing off the coagulant flow, the needle continues to move into the coagulant flow channel towards the channel lumen. In this way, the flow channel is purged of residual coagulant, and a force is provided to cleanly eject the extruded capsule. In other embodiments, an additional input with appropriate valves and pumps may be placed within either the solvent flow path or the coagulant flow path so that a purge slug of solvent, water, air, or an immiscible liquid, such as mineral oil, may be delivered between capsules. The additional input should be constructed so that the purge slug can be delivered precisely at the time of polymer flow termination. In some cases, an outermost third lumen 34 on the extrusion nozzle may be employed to deliver a high flow rate frictional source (e.g., air) which will promote clean termination of capsule extrusion.

During coextrusion, internal pressure, i.e., pressure of the coagulant as it flows through the inner bore, is controlled to assure that solvent in the polymer casting solution is driven outward and, thereby, does not affect adversely the viability of the cell suspension. This transmembrane pressure (TMP) can be adjusted to achieve an optimal level which removes solvent from the casting solution without damaging cells in suspension. While the exact pressure depends on several variables, including nozzle size, flow rate, polymer and coagulant composition, empirical observations can be used to indicate when the desire TMP is achieved. In one preferred form of the invention, the appearance of tiny solvent beads on the outside of the extrudate, approximately 5 mm from the tip of the nozzle, indicate optimal TMP.

Controlling the flow rate is one method of controlling TMP. The flow rate of the coagulant preferably will range from about 0.8 to about 5.0 times the flow rate of the polymer solution. For example, using polyacronitrile/polyvinylchloride (PAN/PVC) as the polymer casting solution, a flow rate of 0.8 ml/minute PAN/PVC with a flow rate of 1.5 ml/minute coagulant can be used.

Various polymers can be used as the casting solution to form the membrane coatings of the present invention. Polymers may include ones derived from solutions which would otherwise be incompatible with the propagation of living cells. For example, polymeric membranes can be formed from polyacrylates (including acrylic copolymers), polyvinylidenes, polyvinyl chloride copolymers, polyurethanes, polystyrenes, polyamides, cellulose acetates, cellulose nitrates, polysulfones, polyacrylonitriles, as well as derivatives, copolymers and mixtures thereof.

The solvent for the polymer solution will depend upon the particular polymer chosen for the membrane material. Suitable solvents include a wide variety of organic solvents, such as alcohols and ketones, generally, as well as dimethylsulfoxide (DMSO), dimethylactemide (DMA) and dimethylformimide (DMF), in particular. In general, water-miscible organic solvents are preferred.

The polymeric solution, or "dope", can also include various additives, including surfactants to enhance the formation of porous channels, as well as antioxidants to sequester oxides that are formed during the coagulation process. Exemplary surfactants include TRITON X 100 available from Sigma Chemical Corp. and PLURONICS P65, P32, and P18. Exemplary anti-oxidants include vitamin C (ascorbic acid) and vitamin E. Moreover, when the vehicles of the present invention are designed for implantation, materials, such as anti-inflammatory agents and cell growth factors, can also be incorporated into the polymeric membrane to reduce immune response or stimulate the cell culture, respectively. Exemplary anti-inflammatory agents include corticoids, such as cortisone, dexamethasone, cortisol, interleukin-1 and its receptor antagonists, and antibodies to TGF-$\beta$, to interleukin-1, and to interferon-gamma. Alternatively, these materials can be added to the multi-compartment cell capsule vehicles after formation by a post-coating or spraying process. For example, the vehicles can be immersed in a solution which contains an anti-inflammatory agent, such as a corticoid, an angiogenic factor, or a growth factor, following extrusion to post-coat the cell capsules.

Post-coating procedures can also be used to provide a protective barrier against immunogens and the like. For example, after formation, the cell vehicles can be coated (e.g., by immersion, spraying or applying a flowing fluid during extrusion) with a surface protecting material, such as polyethylene oxide or polypropylene oxide (e.g., having a molecular weight of about 10,000 Daltons or greater), to inhibit protein interactions with the capsules.

Autoinitiation of extrusion as well as vehicle smoothness may be effectively achieved by using a smooth, non-porous (e.g., glass or ceramic) bore in conjunction with the inventive valve. Similar results may be achieved using a material having surface and wetting characteristics similar to those of glass. While the use of glass is preferred in practicing the inventive method, bores made of other materials, such as metals, (e.g., titanium or stainless steel) or high temperature resistant plastics (e.g., Teflon or PCV acetate) may be used in particular applications.

Products formed using the system of the present invention can take various forms, including hollow fibers and simple tubular extrudates, as well as multi-compartment cell capsule vehicles. The shape of the multi-compartment vehicles can be tubular, resembling sausages, or nearly spherical, resembling strings of pearls. The maximum outer diameter of the vehicle will typically range from about 0.1 to about 1.0 millimeters. The membrane wall thickness will typically range from about 50 to about 200 micrometers. The membrane porosity may be controlled to effectively keep antibodies and other cells from flowing into the extruded capsule, while enabling the encapsulated materials to flow out into the target site. Thus, the porosity is preferably in the range of 50 to 150 kd. The length of the vehicles will vary depending upon the particular application and specific embodiment.

The products can also take the form of "tethered" cell capsules, that is, one or more individual cell compartments connected to a long polymeric tube, rod or string, which can be formed by interrupting the flow of the cell solution while maintaining flow of the casting solution. For that vehicle, the steps of initiating extrusion of the casting solution, initiating delivery of the coagulant, then terminating delivery of the coagulant are performed substantially as for manufacturing other vehicles. However, unlike the other embodiments, following termination of delivery of the coagulant, extrusion of the casting solution continues for a period of time to make a tether. The longer the casting solution continues to extrude, the longer will be the resulting tether. The desired length of the tether will vary in accordance with the target treatment site at which the capsule will be placed, as well as with physical limitations imposed by the material and apparatus used in manufacturing the vehicles.

The tether also can be post-coated with a material (e.g., a polyurethane or the like) which imparts additional strength to the filament. Such tethered cell capsules can find a variety of applications, particularly when implanted in a subject for constitutive delivery of active factors. In use, the cell capsule can be located as close to the target region, or treatment site, (e.g., in the brain, peritoneal cavity or elsewhere) as desired, while the other end of the tether can be fixed at a convenient anchor point or disposal in a readily accessible location for retrieval.

Alternatively, the encapsulated material can be located between two tether-like strands of polymer. In manufacturing the illustrated vehicle, the casting solution is extruded for a length of time prior to initiating delivery of the coagulant. The casting solution then continues to be extruded for a length of time following terminating delivery of the coagulant.

In yet another form, the encapsulation vehicle may be a string of capsules, each capsule containing an aliquot of biologically or chemically-active materials separated by a length of polymer. This string of capsules may be manufactured in accordance with the inventive method by alternating between initiating and terminating delivery of the coagulant, while the casting solution continuously extrudes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a system for forming a tubular extrudate, the system comprising an extrusion head assembly having a nozzle comprising at least a first inner bore and a second outer bore defining an exit channel, coagulant supply means for supplying a coagulant to the inner bore of the extrusion head assembly, and a polymeric solution supply means for supplying a polymeric solution to the outer bore of the extrusion head assembly, such that said coagulant and said polymeric solution can be co-extruded to form an extrudate and said coagulant serving to induce polymeric precipitation into a tubular shape, the improvement comprising a rapid action valve integrated into the extrusion head assembly controlling said coagulant supply means to isolate any of said coagulant remaining in the inner bore from said exit channel upon closure and thereby facilitate clean termination of the tubular extrudate, wherein the rapid action valve comprises a plunger and valve seat assembly, and the valve seat includes a constriction means comprising a lip seal of resilient compressible seal material through which the plunger can pass to effect closure.

2. The system of claim 1 wherein the rapid action valve is integrated into the extrusion head assembly in close proximity to the nozzle.

3. The system of claim 1 wherein movement of the plunger is electromagnetically controlled.

4. The system of claim 1 wherein the seal material comprises an elastomer.

5. The system of claim 1 wherein the seal material comprises a fluorocarbon elastomer.

6. The system of claim 1 wherein the seal material comprises polytetrafluoroethylene.

7. The system of claim 1 wherein the seal material comprises a fiberglass reinforced polytetrafluoroethylene.

8. The system of claim 1 wherein the valve seat comprises an abutment disposed in close proximity to the end of the inner bore to effect closure.

9. A system for forming a tubular extrudate, the system comprising
   (i) an extrusion head assembly having a nozzle comprising a first inner bore and a second outer bore defining an exit channel,
   (ii) a polymeric solution supply means for extruding a polymeric solution from the outer bore of said extrusion head assembly,
   (iii) a coagulant supply means for extruding a coagulant from the inner bore of said extrusion head assembly, the coagulant extruded from the inner bore having a pressure greater than a pressure of the polymeric solution extruded from the outer bore and serving to induce polymeric precipitation of the polymeric solution into a tubular shape, and
   (iv) a rapid action valve integrated into said extrusion head assembly for controlling the coagulant extruded from the inner bore of said extrusion head assembly, said rapid action valve allowing periodic isolation of any coagulant remaining in the inner bore from the exit channel upon closure and thereby facilitate clean termination of the tubular extrudate, wherein the valve comprises a plunger and valve seat assembly, and the valve seat includes a constriction means comprising a lip seal of resilient compressible seal material through which the plunger can pass to effect closure.

* * * * *